US012684673B2

(12) United States Patent　　　(10) Patent No.:　US 12,684,673 B2
Arai et al.　　　　　　　　　　　(45) Date of Patent:　　Jul. 14, 2026

(54) LIGHTING SYSTEM

(71) Applicants: TOYOTA JIDOSHA KABUSHIKI KAISHA, Aichi-ken (JP); Sumitomo Wiring Systems, Ltd., Mie (JP)

(72) Inventors: Yuuki Arai, Toyota (JP); Yasunori Wakamatsu, Nagakute (JP); Hisao Takahashi, Toyota (JP); Masaaki Aoki, Nagoya (JP); Akihiro Kusada, Yokkaichi (JP); Tadashi Naruse, Yokkaichi (JP)

(73) Assignees: TOYOTA JIDOSHA KABUSHIKI KAISHA, Aichi-Ken (JP); Sumitomo Wiring Systems, Ltd., Mie (JP)

(*) Notice: Subject to any disclaimer, the term of this patent is extended or adjusted under 35 U.S.C. 154(b) by 22 days.

(21) Appl. No.: 18/884,116

(22) Filed: Sep. 13, 2024

(65) Prior Publication Data

US 2025/0098054 A1　　　Mar. 20, 2025

(30) Foreign Application Priority Data

Sep. 19, 2023　(JP) ................................ 2023-150712

(51) Int. Cl.
| | |
|---|---|
| *H05B 47/115* | (2020.01) |
| *B60Q 3/217* | (2017.01) |
| *B60Q 3/80* | (2017.01) |
| *H05B 47/11* | (2020.01) |
| *H05B 47/17* | (2020.01) |

(52) U.S. Cl.
CPC ........... *H05B 47/115* (2020.01); *B60Q 3/217* (2017.02); *B60Q 3/80* (2017.02); *H05B 47/11* (2020.01); *H05B 47/17* (2020.01)

(58) Field of Classification Search
None
See application file for complete search history.

(56) References Cited

U.S. PATENT DOCUMENTS

| | | | |
|---|---|---|---|
| 10,035,463 B1 * | 7/2018 | Salter ....................... B60R 5/04 |
| 2005/0046584 A1 * | 3/2005 | Breed ................ B60N 2/02246 |
| | | | 340/13.31 |
| 2005/0248944 A1 * | 11/2005 | Sloan ..................... H05B 45/30 |
| | | | 362/234 |
| 2006/0208169 A1 * | 9/2006 | Breed .................... G01S 15/88 |
| | | | 250/221 |

(Continued)

FOREIGN PATENT DOCUMENTS

| | | |
|---|---|---|
| JP | 2008-299779 A | 12/2008 |
| JP | 2015-039979 A | 3/2015 |

*Primary Examiner* — Srinivas Sathiraju
(74) *Attorney, Agent, or Firm* — HAUPTMAN HAM, LLP

(57) ABSTRACT

A lighting system includes a door illumination provided on the inner surface of a side door, a rear detection sensor for detecting an object around a vehicle, and a control device for controlling the door illumination based on the detection result of the rear detection sensor. The lighting system further includes a luminance sensor for detecting the brightness around the vehicle. The control device is configured to light the door illumination or blinks the door illumination on and off when an object is detected by the rear detection sensor, and adjust the luminance when the door illumination is lighted or blinked on and off, according to the brightness detected by the luminance sensor.

7 Claims, 4 Drawing Sheets

(56) References Cited

U.S. PATENT DOCUMENTS

| | | | | |
|---|---|---|---|---|
| 2006/0250229 | A1* | 11/2006 | Cheng | B60Q 1/442 |
| | | | | 340/468 |
| 2006/0271261 | A1* | 11/2006 | Flores | B60Q 3/80 |
| | | | | 701/49 |
| 2012/0154612 | A1* | 6/2012 | Naruse | H04N 23/673 |
| | | | | 348/208.4 |
| 2013/0342112 | A1* | 12/2013 | Hidaka | H05B 47/125 |
| | | | | 315/152 |
| 2015/0239395 | A1* | 8/2015 | Rogge | B60Q 3/80 |
| | | | | 315/77 |
| 2016/0089954 | A1* | 3/2016 | Rojas Villanueva | |
| | | | | B60H 1/00742 |
| | | | | 701/36 |
| 2016/0121724 | A1* | 5/2016 | Iwaya | B60C 9/00 |
| | | | | 701/123 |
| 2018/0236928 | A1* | 8/2018 | Fritz | B60Q 1/245 |
| 2019/0202340 | A1* | 7/2019 | Sugimoto | B60Q 1/143 |
| 2019/0217776 | A1* | 7/2019 | Sato | B60Q 3/80 |
| 2019/0258250 | A1* | 8/2019 | Naruse | G05D 1/0061 |
| 2019/0327814 | A1* | 10/2019 | Altinger | H05B 45/12 |
| 2019/0337449 | A1* | 11/2019 | Diana | H05K 1/189 |
| 2020/0207264 | A1* | 7/2020 | Camras | F21K 9/65 |
| 2020/0307573 | A1* | 10/2020 | Kato | B60W 60/0027 |
| 2020/0307631 | A1* | 10/2020 | Tsuji | B60T 17/22 |
| 2020/0307632 | A1* | 10/2020 | Tsuji | B60W 60/0059 |
| 2020/0307633 | A1* | 10/2020 | Naruse | B60W 60/0059 |
| 2020/0307639 | A1* | 10/2020 | Tsuji | B60W 60/0059 |
| 2020/0307646 | A1* | 10/2020 | Kato | B60W 50/00 |
| 2020/0310418 | A1* | 10/2020 | Kanoh | B62D 15/0285 |
| 2021/0046862 | A1* | 2/2021 | Wang | G06V 20/584 |
| 2021/0155155 | A1* | 5/2021 | Havemann | B60Q 3/51 |
| 2021/0253124 | A1* | 8/2021 | Naruse | B60Q 60/005 |
| 2021/0261050 | A1* | 8/2021 | Sobhany | B60Q 3/80 |
| 2022/0144167 | A1* | 5/2022 | Lee | B60Q 3/20 |
| 2022/0262247 | A1* | 8/2022 | Gao | G08G 1/096791 |
| 2022/0305987 | A1* | 9/2022 | Yano | B60L 1/14 |
| 2022/0314991 | A1* | 10/2022 | Naruse | B60W 50/14 |
| 2022/0330400 | A1* | 10/2022 | Unterweger | H05B 47/125 |
| 2023/0101008 | A1* | 3/2023 | Naruse | B60W 30/182 |
| | | | | 717/173 |
| 2024/0112509 | A1* | 4/2024 | Wakamatsu | B60Q 9/00 |
| 2024/0166127 | A1* | 5/2024 | Wang | B60Q 9/00 |
| 2024/0174171 | A1* | 5/2024 | Wakamatsu | B60Q 3/80 |
| 2025/0010790 | A1* | 1/2025 | Schumacher | B60Q 3/54 |
| 2025/0098054 | A1* | 3/2025 | Arai | H05B 47/11 |

* cited by examiner

| | BRIGHTNESS OF SURROUNDINGS (Bn) | | | |
| | BRIGHT (Bn > Bt1) | SLIGHTLY BRIGHT (Bt1 ≥ Bn > Bt2) | SLIGHTLY DARK (Bt2 ≥ Bn > Bt3) | DARK (Bt3 ≥ Bn) |
| --- | --- | --- | --- | --- |
| DOOR IS IN CLOSED STATE | Lc1 | Lc2 | Lc3 | Lc4 |
| DOOR IS IN OPEN STATE | Lo1 | Lo2 | Lo3 | Lo4 |

LIGHTING SYSTEM

CROSS-REFERENCE TO RELATED APPLICATION

This application claims priority to Japanese Patent Application No. 2023-150712 filed on Sep. 19, 2023. The disclosure of the above-identified application, including the specification, drawings, and claims, is incorporated by reference herein in its entirety.

BACKGROUND

1. Technical Field

The present disclosure relates to a lighting system.

2. Description of Related Art

Lighting systems to be applied to vehicles have been conventionally known (for example, see Japanese Unexamined Patent Application Publication No. 2015-39979).

A lighting system includes a door illumination provided on the inner surface of a side door, and a control device for controlling the door illumination. The control device is configured to light the door illumination when the side door is in a closed state and blink the door illumination on and off when the side door is in an open state in a case where an object (for example, another vehicle or a pedestrian) is detected around the vehicle. In this way, the door illumination is lighted or blinked on and off in a case where an object is detected around the vehicle, thereby alerting an occupant, so that it is possible to improve safety when the occupant gets out of the vehicle.

SUMMARY

Here, in the above-mentioned conventional lighting system, if the door illumination is lighted or blinked on and off when it is dark around the vehicle, it is considered that an occupant may feel dazzled.

The present disclosure has been made to solve the above problem, and has an object to provide a lighting system that can restrain an occupant from feeling dazzled while ensuring visual attractiveness.

A lighting system according to the present disclosure includes a light-emitting unit provided on the inner surface of a vehicle door, a first sensor that detects an object around a vehicle, and a control device that controls the light-emitting unit based on a detection result of the first sensor. The lighting system further includes a second sensor that detects brightness around the vehicle. The control device is configured to light the light-emitting unit or blink the light-emitting unit on and off when an object is detected by the first sensor, and also configured to adjust luminance when the light-emitting unit is lighted or blinked on and off, according to the brightness detected by the second sensor.

In the above lighting system, the control device may be configured to more greatly lower the luminance when the light-emitting unit is lighted or blinked on and off as surroundings of the vehicle are darker.

In the above lighting system, the control device may be configured to light the light-emitting unit or blink the light-emitting unit on and off when an object is detected around the vehicle in a state where the vehicle is stopped.

In this case, the control device may be configured to light the light-emitting unit when the vehicle door is in a closed state and blink the light-emitting unit on and off when the vehicle door is in an open state in a case where an object is detected around the vehicle in a state where the vehicle is stopped.

According to the lighting system of the present disclosure, it is possible to restrain an occupant from feeling dazzled while ensuring visual attractiveness.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described hereunder.

Figures 1, 2:
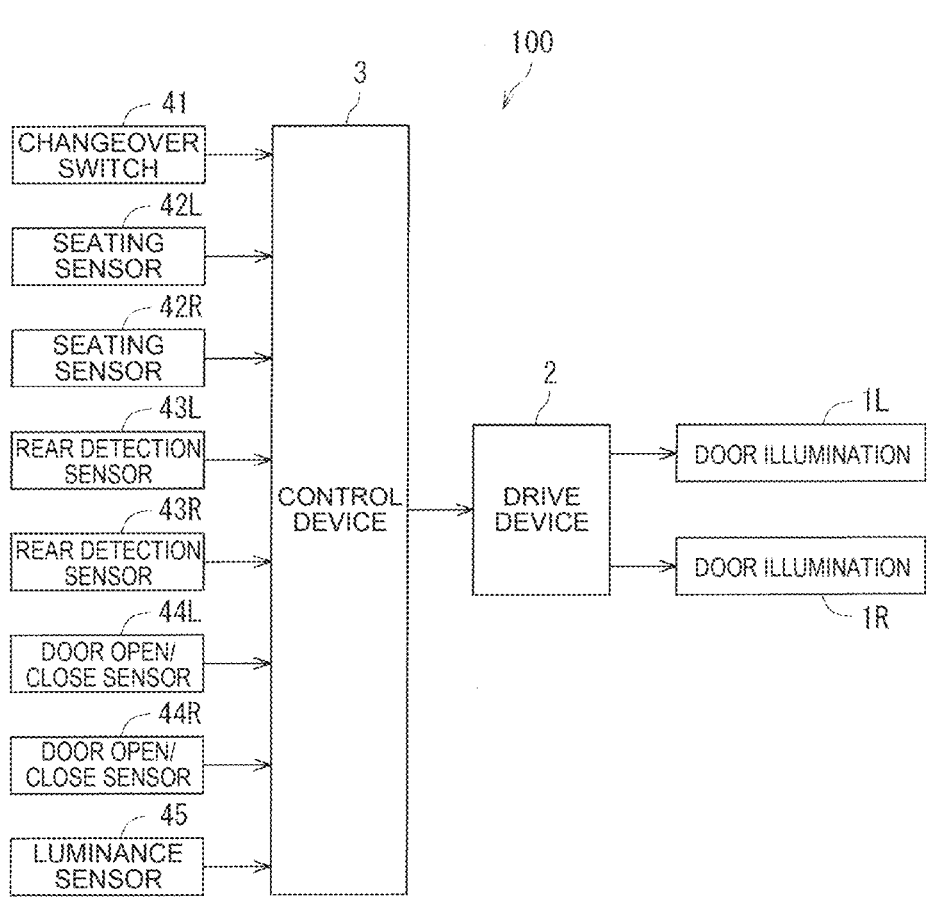
FIG. 1 is a block diagram showing a configuration of a lighting system of an embodiment.
FIG. 2 is a diagram showing a light emission pattern under alighting assist control in the lighting system of FIG. 1.

First, a lighting system 100 according to the present embodiment will be described with reference to FIG. 1 and FIG. 2.

The lighting system 100 is applied to a vehicle. As shown in FIG. 1, the lighting system 100 includes door illuminations 1L and 1R, a drive device 2, a control device 3, a changeover switch 41, seating sensors 42L and 42R, rear detection sensors 43L and 43R, door open/close sensors 44L and 44R, and a luminance sensor 45. Note that the door illuminations 1L and 1R are an example of a "light emitting unit" of the present disclosure, the rear detection sensors 43L and 43R are an example of a "first sensor" of the present disclosure, and the luminance sensor 45 is an example of a "second sensor" of the present disclosure.

The door illuminations 1L and 1R are configured to be capable of emitting light, and are provided to decorate the side doors. Furthermore, the door illuminations 1L and 1R are used when it is necessary to draw the attention of occupants when they get off the vehicle. Note that the side door is an example of a "vehicle door" of the present disclosure.

The door illumination 1L is provided on the inner surface of the side door on the left side (driver's seat side), and is formed in an elongated shape so as to extend, for example, in a vehicle front-rear direction. The door illumination 1L is arranged inside a vehicle cabin such that an occupant sitting on the driver's seat can see the door illumination 1L. The door illumination 1R is provided on the inner surface of the side door on the right side (assistant driver's seat side), and is formed in an elongated shape so as to extend, for example, in the vehicle front-rear direction. The door illumination 1R is arranged inside the vehicle cabin such that an occupant sitting on the assistant driver's seat can see the door illumination 1R.

The drive device 2 is provided to drive the door illuminations 1L and 1R. The control device 3 includes a calculation unit, a storage unit, etc. (not shown), and is configured to control the door illuminations 1L and 1R by using the drive device 2. The changeover switch 41, the seating sensors 42L, 42R, the rear detection sensors 43L, 43R, the door open/close sensors 44L, 44R, and the luminance sensor 45 are connected to the control device 3. The control device 3 is configured to control the light emission of the door illuminations 1L and 1R based on inputs from these sensor group.

The changeover switch 41 is disposed, for example, on a steering wheel, and is provided to switch the on/off state of an alighting assist function. The on/off state of the alighting assist function is stored in the control device 3. When the alighting assist function is in an on-state, an occupant is alerted if there is an object (for example, another vehicle or a pedestrian) around the vehicle, whereby it is possible to improve safety when the occupant alights from the vehicle.

The seating sensor 42L is provided to determine whether there is an occupant on the driver's seat, and the seating sensor 42R is provided to determine whether there is an occupant on the assistant driver's seat. The rear detection sensors 43L and 43R are, for example, radar sensors, and are disposed in a rear bumper. The rear detection sensor 43L is provided to detect an object on the left rear side of the host vehicle, and the rear detection sensor 43R is provided to detect an object on the right rear side of the host vehicle.

The door open/close sensor 44L is provided to detect the open/close state of the side door on the left side (driver's seat side), and the door open/close sensor 44R is provided to detect the open/close state of the side door on the right side (assistant driver's seat side). The luminance sensor 45 is provided to detect the brightness around the host vehicle. For example, the luminance sensor 45 is provided on the inner surface of a front windshield, and is arranged in the center of the upper end portion of the front windshield in the vehicle width direction.

Specifically, the control device 3 is configured to control the door illumination 1L to perform alighting assist control when the rear detection sensor 43L detects an object in a state where the vehicle is stopped. Under the alighting assist control, in order to alert the occupant on the driver's seat, the door illumination 1L is lighted in red when the side door on the driver's seat side is in a closed state, and the door illumination 1L is blinked on and off in red when the side door on the driver's seat side is in an open state. For example, the red color of the door illumination 1L is a dedicated color for calling driver's attention. On the other hand, the control device 3 is configured to normally control the door illumination 1L when the vehicle is running, etc. On the normal control, the door illumination 1L is appropriately illuminated in color other than red for decorative purposes.

Similarly, the control device 3 is configured to perform the alighting assist control on the door illumination 1R when an object is detected by the rear detection sensor 43R in a state where the vehicle is stopped. Under the alighting assist control, in order to alert the occupant on the assistant driver's seat, the door illumination 1R is lighted in red when the side door on the assistant driver's seat side is in the closed state, and the door illumination 1R is blinked on and off in red when the side door on the assistant driver's seat side is in an open state. For example, the red color of the door illumination 1R is a dedicated color for calling attention. On the other hand, the control device 3 is configured to normally control the door illumination 1R when the vehicle is running, etc. Under the normal control, the door illumination 1R is lighted as appropriate in a color other than red for decorative purposes.

Here, the control device 3 is configured to determine the brightness around the vehicle based on the brightness Bn of the surroundings of the vehicle detected by the luminance sensor 45. For example, as shown in FIG. 2, when the brightness Bn of the surroundings of the vehicle exceeds a threshold value Bt1, it is determined that the surroundings of the vehicle are bright. When the brightness Bn of the surroundings of the vehicle is equal to or less than the threshold Bt1 and also exceeds a threshold value Bt2, it is determined that the surroundings of the vehicle are slightly bright. When the brightness Bn of the surroundings of the vehicle is equal to or less than the threshold value Bt2 and also exceeds a threshold value Bt3, it is determined that the surroundings of the vehicle are slightly dark. When the brightness Bn of the surroundings of the vehicle is equal to or less than the threshold value Bt3, it is determined that the surroundings of the vehicle are dark. Note that the threshold values Bt1, Bt2, and Bt3 are preset values, the threshold value Bt1 is larger than the threshold value Bt2, and the threshold value Bt2 is larger than the threshold value Bt3.

The control device 3 is configured to adjust the luminance of the door illumination 1L when the door illumination 1L is lighted or blinked on and off, according to the brightness around the vehicle under the alighting assist control. The control device 3 adjusts the luminance of the door illumination 1L such that the luminance of the door illumination 1L when the door illumination 1L is lighted or blinked on and off is lower as it is darker around the vehicle under the alighting assist control.

For example, in a case where the side door on the driver's seat side is in the closed state, the door illumination 1L is lighted at luminance Lc1 when it is bright around the vehicle, the door illumination 1L is lighted at luminance Lc2 when it is slightly bright around the vehicle, the door illumination 1L is lighted at luminance Lc3 when it is slightly dark around the vehicle, and the door illumination 1L is lighted at luminance Lc4 when it is dark around the vehicle. In a case where the side door on the driver's seat side is in the open state, the door illumination 1L is blinked on and off at luminance Lo1 when it is bright around the vehicle, the door illumination 1L is blinked on and off at luminance Lo2 when it is slightly bright around the vehicle, the door illumination 1L is blinked on and off at luminance Lo3 when it is slightly dark around the vehicle, and the door illumination 1L is blinked on and off at luminance Lo4 when it is dark around the vehicle.

The luminances Lc1, Lc2, Lc3, Lc4, Lo1, Lo2, Lo3, and Lo4 are preset values. The luminance Lc4 is lower than the luminance Lc3, the luminance Lc3 is lower than the luminance Lc2, and the luminance Lc2 is lower than the luminance Lc1. The luminance Lo4 is lower than the luminance Lo3, the luminance Lo3 is lower than the luminance Lo2, and the luminance Lo2 is lower than the luminance Lo1. For example, the luminance Lc1 is lower than the luminance Lo1, the luminance Lc2 is lower than the luminance Lo2, the luminance Lc3 is lower than the luminance Lo3, and the luminance Lc4 is lower than the luminance Lo4.

In other words, the control device 3 is configured to adjust the luminance of the door illumination 1L in four stages according to the brightness around the vehicle under the alighting assist control. This makes it possible to restrain an occupant from feeling dazzled while ensuring the visual attractiveness under the alighting assist control. Note that the alighting assist control of the door illumination 1R is configured in the same manner.

Light Emission Control of Door Illumination 1L

Figure 3:
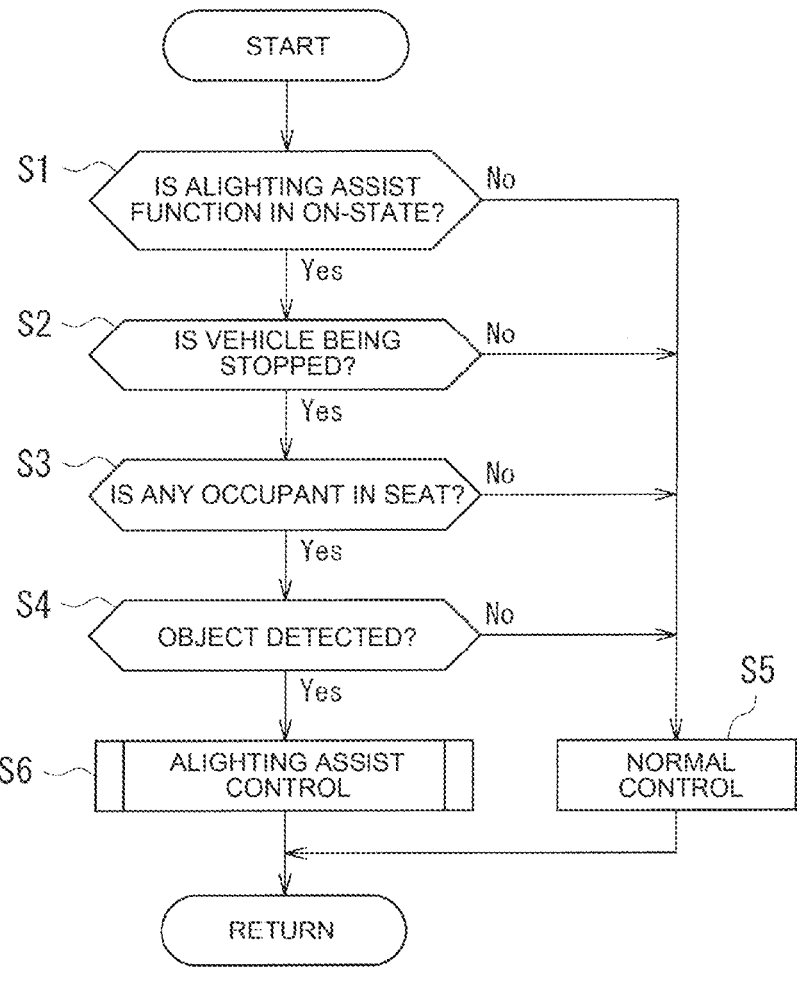
FIG. 3 is a flowchart showing light emission control of a door illumination on a driver's seat side by the control device of the present embodiment.
Figure 4:
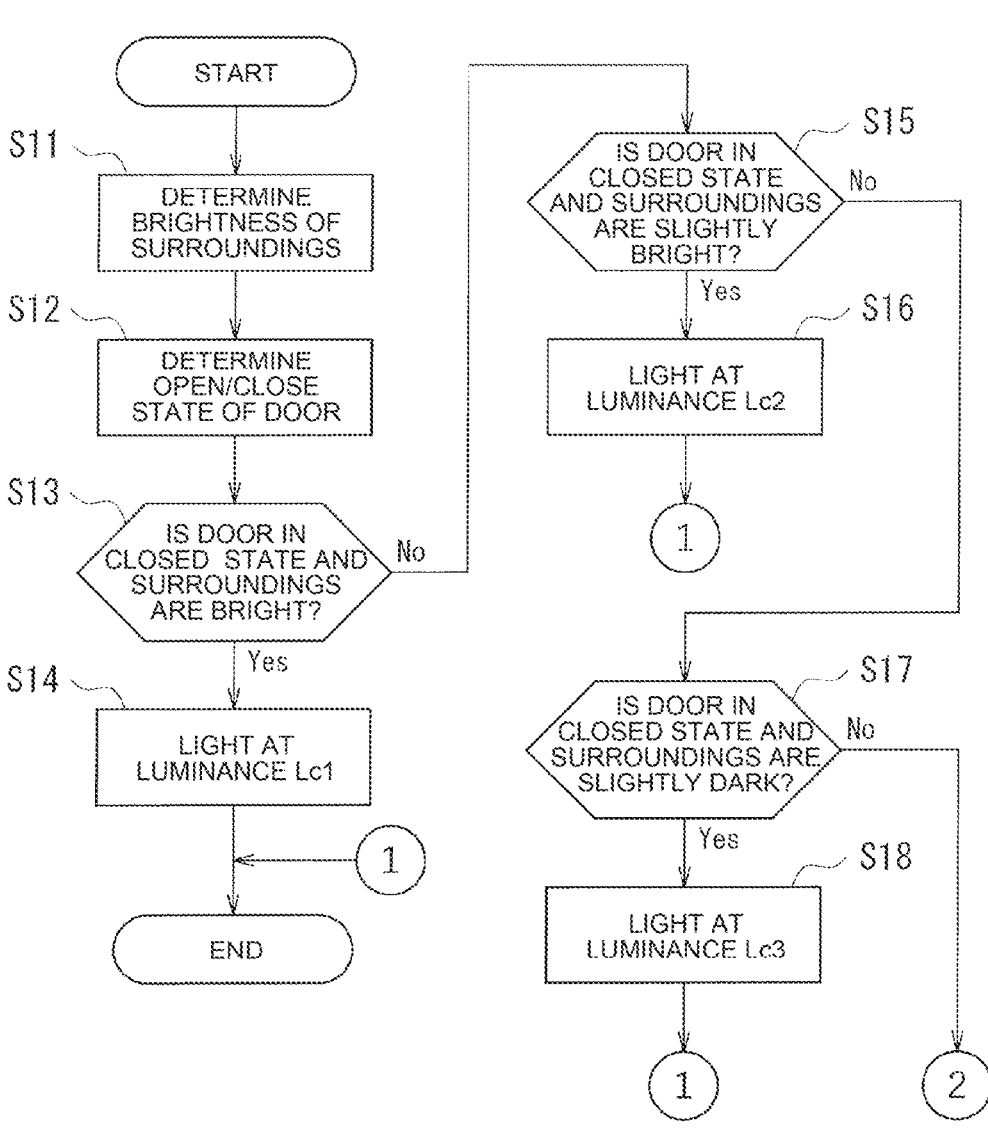
FIG. 4 is a first half part of a flowchart showing the alighting assist control in step S6 of FIG. 3.
Figure 5:
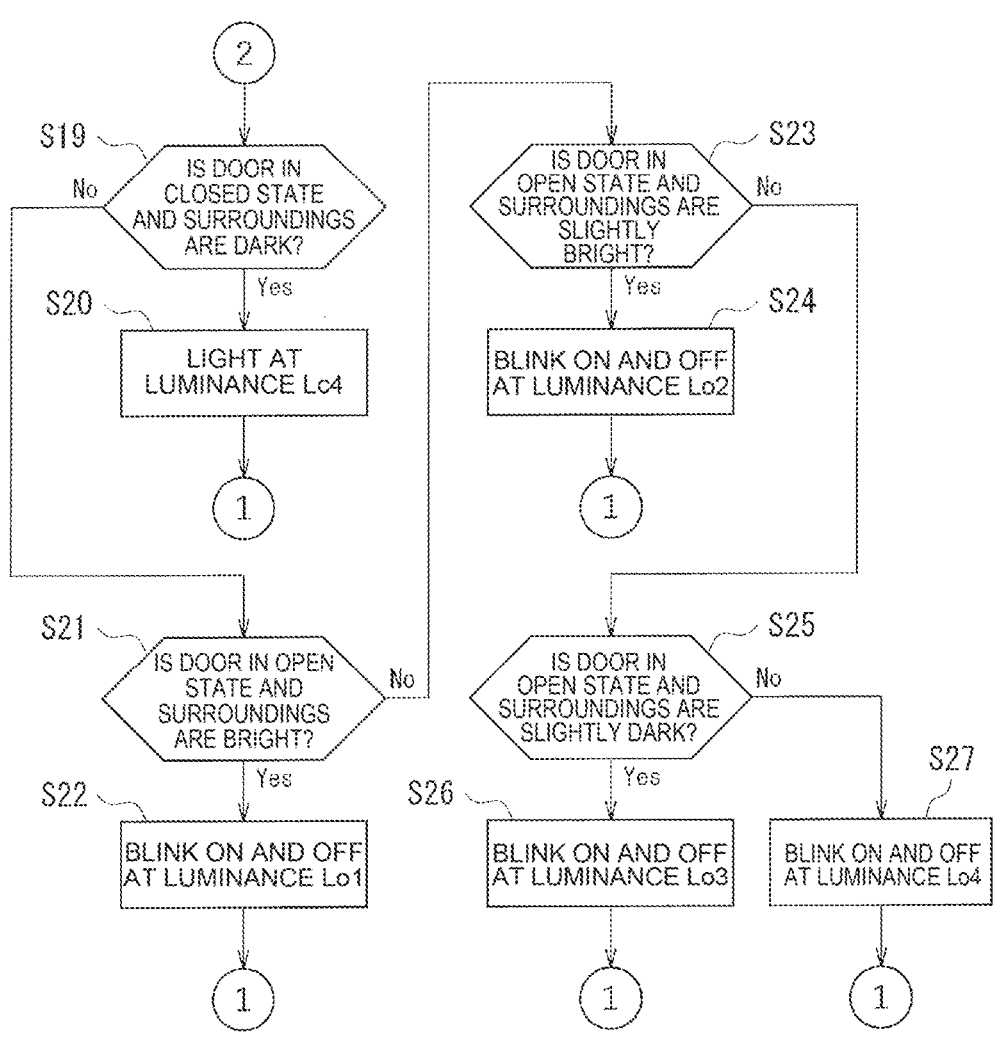
FIG. 5 is a second half part of the flowchart showing the alighting assist control in step S6 of FIG. 3.

Next, the light emission control of the door illumination 1L on the driver's seat side by the control device 3 of the present embodiment will be described with reference to FIGS. 3 to 5. A flowchart of FIG. 3 is repeatedly performed at a predetermined time interval, and flowcharts of FIG. 4 and FIG. 5 are subroutines of step S6 in FIG. 3. Note that the light emission control of the door illumination 1R on the assistant driver's seat side is almost the same as the light emission control of the door illumination 1L on the driver's seat side, and duplicative description thereon will be omitted.

First, in step S1 of FIG. 3, it is determined by the control device 3 whether an alighting assist function is in an ON-state. If it is determined by the control device 3 that the alighting assist function is in the ON-state, the process proceeds to step S2. On the other hand, if it is determined by the control device 3 that the alighting assist function is not in the ON-state (if the alighting assist function is in an OFF-state), the process proceeds to step S5.

Next, in step S2, it is determined by the control device 3 whether the vehicle is stopped. For example, the vehicle may be determined to be stopped when the vehicle speed is less than a predetermined value, or the vehicle may be determined to be stopped when the shift range is set to a parking range. If it is determined by the control device 3 that the vehicle is stopped, the process proceeds to step S3. On the other hand, if it is determined by the control device 3 that the vehicle is not stopped (for example, if the vehicle is running), the process proceeds to step S5.

Next, in step S3, it is determined by the control device 3 whether there is an occupant on the driver's seat. For example, whether there is an occupant on the driver's seat is determined based on the detection result of the seating sensor 42L. If it is determined by the control device 3 that there is an occupant on the driver's seat, the process proceeds to step S4. On the other hand, if it is determined by the control device 3 that there is no occupant on the driver's seat, the process proceeds to step S5.

Next, in step S4, it is determined by the control device 3 whether there is an object around the vehicle. For example, whether there is an object around the vehicle is determined based on the detection result of the rear detection sensor 43L. In other words, in step S4, it is determined whether there is an object on the left rear side of the host vehicle. Note that the object is, for example, another vehicle, a pedestrian or the like. If it is determined by the control device 3 that there is an object around the vehicle, the process proceeds to step S6. On the other hand, if it is determined by the control device 3 that there is no object around the vehicle, the process proceeds to step S5.

In step S5, the control device 3 performs normal control on the door illumination 1L by using the drive device 2. In other words, the door illumination 1L is appropriately lighted in a color other than red. After the normal control is performed, the process returns.

In step S6, the control device 3 performs the alighting assist control on the door illumination 1L by using the drive device 2. The alighting assist control will be described later. After the alighting assist control is performed, the process returns.

Alighting Assist Control

In the alighting assist control, in step S11 in FIG. 4, the brightness around the vehicle is first determined by the control device 3. The brightness around the vehicle is determined using the brightness Bn around the vehicle detected by the luminance sensor 45. For example, as described above, it is determined to be bright in the case of Bn>Bt1, it is determined to be slightly bright in the case of Bt1≧Bn>Bt2, it is determined to be slightly dark in the case of Bt2≧Bn>Bt3, and it is determined to be dark in the case of Bt3≧Bn.

Next, in step S12, the open/close state of the side door on the driver's seat side is determined by the control device 3. The open/close state of the side door on the driver's seat side is determined based on the detection result of the door open/close sensor 44L.

Next, in step S13, it is determined by the control device 3 whether the side door on the driver's seat side is in the closed state and it is bright around the vehicle. If it is determined by the control device 3 that the side door on the driver's seat side is in the closed state and it is bright around the vehicle, the process proceeds to step S14. Otherwise, the process proceeds to step S15.

Next, in step S14, the control device 3 uses the drive device 2 to light the door illumination 1L at the luminance Lc1. At this time, the door illumination 1L is lighted in red which is a dedicated color for calling attention. Thereafter, the process proceeds to END.

In step S15, it is determined by the control device 3 whether the side door on the driver's seat side is in the closed state and it is slightly bright around the vehicle. If it is determined by the control device 3 that the side door on the driver's seat side is in the closed state and it is slightly bright around the vehicle, the process proceeds to step S16. Otherwise, the process proceeds to step S17.

Next, in step S16, the control device 3 uses the drive device 2 to light the door illumination 1L at the luminance Lc2. At this time, the door illumination 1L is lighted in red which is a dedicated color for calling attention, and lighted at the luminance Lc2 lower than the luminance Lc1. Thereafter, the process proceeds to END.

In step S17, it is determined by the control device 3 whether the side door on the driver's seat side is in the closed state and it is slightly dark around the vehicle. If it is determined by the control device 3 that the side door on the driver's seat side is in the closed state and it is slightly dark around the vehicle, the process proceeds to step S18. Otherwise, the process proceeds to step S19 in FIG. 5.

Next, in step S18, the control device 3 uses the drive device 2 to light the door illumination 1L at the luminance Lc3. At this time, the door illumination 1L is lighted in red which is a dedicated color for calling attention, and is lighted at the luminance Lc3 lower than the luminance Lc2. Then, the process proceeds to END.

In step S19 of FIG. 5, it is determined by the control device 3 whether the side door on the driver's seat side is in the closed state and it is dark around the vehicle. If it is determined by the control device 3 that the side door on the driver's seat side is in the closed state and it is dark around the vehicle, the process proceeds to step S20. Otherwise, the process proceeds to step S21.

Next, in step S20, the control device 3 uses the drive device 2 to light the door illumination 1L at the luminance Lc4. At this time, the door illumination 1L is lighted in red which is a dedicated color for calling attention, and is lighted at the luminance Lc4 lower than the luminance Lc3. Thereafter, the process proceeds to END.

In step S21, it is determined by the control device 3 whether the side door on the driver's seat side is in the open state and it is bright around the vehicle. If it is determined by the control device 3 that the side door on the driver's seat side is in the open state and it is bright around the vehicle, the process proceeds to step S22. Otherwise, the process proceeds to step S23.

Next, in step S22, the control device 3 uses the drive device 2 to blink the door illumination 1L on and off at the luminance Lo1. At this time, the door illumination 1L is blinked on and off in red which is a dedicated color for calling attention. Thereafter, the process proceeds to END.

In step S23, it is determined by the control device 3 whether the side door on the driver's seat side is in the open state and it is slightly bright around the vehicle. If it is determined by the control device 3 that the side door on the driver's seat side is in the open state and it is slightly bright around the vehicle, the process proceeds to step S24. Otherwise, the process proceeds to step S25.

Next, in step S24, the control device 3 uses the drive device 2 to blink the door illumination 1L on and off at the luminance Lo2. At this time, the door illumination 1L is blinked on and off in red which is a dedicated color for calling attention, and it is blinked on and off at the luminance Lo2 lower than the luminance Lo1. Thereafter, the process proceeds to END.

In step S25, it is determined by the control device 3 whether the side door on the driver's seat side is in the open state and it is slightly dark around the vehicle. If it is determined by the control device 3 that the side door on the driver's seat side is in the open state and it is slightly dark around the vehicle, the process proceeds to step S26. Otherwise (if the side door on the driver's seat side is in the open state and it is dark around the vehicle), the process proceeds to step S27.

Next, in step S26, the control device 3 uses the drive device 2 to blink the door illumination 1L on and off at the luminance Lo3. At this time, the door illumination 1L is blinked on and off in red which is a dedicated color for calling attention, and it is blinked on and off at the luminance Lo3 lower than the luminance Lo2. Thereafter, the process proceeds to END.

Furthermore, in step S27, the control device 3 uses the drive device 2 to blink the door illumination 1L on and off at the luminance Lo4. At this time, the door illumination 1L is blinked on and off in red which is a dedicated color for calling attention, and it is blinked on and off at the luminance Lo4 lower than the luminance Lo3. Thereafter, the process proceeds to END.

Effect

As described above, the present embodiment is configured such that the door illumination 1L (1R) is lighted or blinked on and off when an object is detected around the vehicle in a state where the vehicle is stopped. By alerting an occupant as described above, it is possible to enhance safety when the occupant alights from the vehicle. Furthermore, the present embodiment is configured such that the luminance of the door illumination 1L (1R) when the door illumination 1L (1R) is lighted or blinked on and off is adjusted according to the brightness around the vehicle. With this configuration, the luminance of the door illumination 1L (1R) is more greatly lowered as it is darker around the vehicle, whereby it is possible to restrain the occupant from feeling dazzled while visual attractiveness is ensured.

Furthermore, in the present embodiment, the luminance of the door illumination 1L (1R) is adjusted in four stages, whereby it is possible to appropriately adjust the luminance of the door illumination 1L (1R) according to the brightness around the vehicle.

Furthermore, in the present embodiment, the rear detection sensor 43L (43R) is provided, whereby the occupant can be alerted, for example, when another vehicle or a pedestrian approaches from the rear side of the vehicle.

Other Embodiments

It should be noted that the embodiments disclosed herein are illustrative in all respects, and are not intended to be grounds for limiting interpretation. Therefore, the technical scope of the present disclosure is not interpreted solely by the above-described embodiments, but is defined by the recitation of the claims. Furthermore, the technical scope of the present disclosure includes meanings equivalent to the scope of the claims and all modifications within the scope.

For example, the above embodiments show the example in which in a case where an object is detected around the vehicle, the door illumination 1L (1R) is lighted when the side door is in the closed state, and the door illumination 1L (1R) is blinked on and off when the side door is in the open state. However, these embodiments are not limited to this example, and in a case where an object is detected around the vehicle, the door illumination may be lighted or blinked on and off regardless of the open/close state of the side door.

The above embodiments show the example in which the luminance of the door illumination 1L (1R) is adjusted in four stages. However, these embodiments are not limited to this example, and the luminance of the door illumination may be adjusted in two stages or three stages, or may be adjusted in five or more stages.

The above embodiments show the example in which the door illumination 1L (1R) is provided on the side door on the front side. However, these embodiments are not limited to this example, and the door illumination (not shown) may be provided on the side door on the rear side, etc.

The above embodiments show the example in which the seating sensor 42L (42R) is used to determine whether an occupant is present. However, the embodiments are not limited to this example, and whether an occupant is present may be determined using a buckle switch of a seatbelt (not shown), or whether an occupant is present may be determined using an imaging device (not shown) for imaging the interior of a vehicle cabin.

Furthermore, the above embodiments show the example in which the rear detection sensor 43L (43R) for detecting an object behind the vehicle is provided. However, the embodiments are not limited to this example, and a front detection sensor (not shown) for detecting an object in front of the vehicle may be provided.

The above embodiments show the example in which the rear detection sensor 43L (43R) is a radar sensor. However, the embodiments are not limited to this example, and the rear detection sensor may be a camera, a sonar or the like.

The present disclosure can be used in a lighting system to be applied to a vehicle.

What is claimed is:

1. A lighting system comprising:
a light-emitting unit provided on an inner surface of a vehicle door;
a first sensor configured to detect an object around a vehicle;
a control device configured to control the light-emitting unit based on a detection result of the first sensor; and a second sensor configured to detect brightness around the vehicle, wherein the control device is configured to light the light-emitting unit or blink the light-emitting unit on and off in a first color for calling attention in response to a detection of an object by the first sensor, and also configured to adjust luminance when the light-emitting unit is lighted or blinked on and off, according to the brightness detected by the second sensor, and the control device is configured to light the light-emitting unit or blink the light-emitting unit on and off in a second color, which is different from the first color, in response to no detection of an object by the first sensor.

2. The lighting system according to claim 1, wherein the control device is configured to more greatly lower the luminance when the light-emitting unit is lighted or blinked on and off as surroundings of the vehicle are darker, according to the brightness detected by the second sensor.

3. The lighting system according to claim 2, wherein the control device is configured to light the light-emitting unit or blink the light-emitting unit on and off (1) at a first luminance level in response to the brightness detected by the second sensor being lower than a first threshold, (2) at a second luminance level in response to the brightness detected by the second sensor being higher than the first threshold and lower than a second threshold, and (3) at a third luminance level in response to the brightness detected by the second sensor being higher than the second threshold, where the first luminance level is lower than the second luminance level, and the second luminance level is lower than the third luminance level, and the first threshold is lower than the second threshold.

4. The lighting system according to claim 3, further comprising a third sensor configured to detect an occupant on a seat of the vehicle, wherein the control device is configured to light or blink the light-emitting unit in the first color and at the first, second or third luminance level according to the brightness detected by the second sensor, in response to a detection of the occupant by the third sensor and in response to the detection of the object by the first sensor, and in the second color, in response to the detection of no occupant by the third sensor.

5. The lighting system according to claim 1, wherein the control device is configured to light the light-emitting unit or blink the light-emitting unit on and off when an object is detected around the vehicle by the first sensor in a state where the vehicle is stopped.

6. The lighting system according to claim 1, wherein the control device is configured to, in a case where an object is detected by the first sensor around the vehicle in a state where the vehicle is stopped, light the light-emitting unit when the vehicle door is in a closed state, and blink the light-emitting unit on and off when the vehicle door is in an open state.

7. The lighting system according to claim 1, wherein he first sensor includes a left rear detection sensor and a right rear detection sensor.

* * * * *